Sept. 25, 1962 C. L. WAPPNER 3,055,216
WIND SPEED METER
Filed July 1, 1957

INVENTOR.
CHARLES L. WAPPNER
BY Tom Walker
ATTORNEY 3,055,216
WIND SPEED METER
Charles L. Wappner, Springfield, Ohio, assignor to The Ohio Thermometer Company, Springfield, Ohio, a corporation of Ohio
Filed July 1, 1957, Ser. No. 669,204
1 Claim. (Cl. 73—205)

This invention relates to wind velocity sensing and indicating apparatus, particularly of the kind comprising a sensing device exposed to the action of the wind and a relatively remote indicating device responding to a changing condition at the sensing device.

The object of the invention is to simplify the construction as well as the means and mode of operation of wind velocity meters, whereby such meters may not only be economically manufactured, but will be more efficient and satisfactory in use, adaptable to a wide variety of applications, and be unlikely to get out of order.

An object of the invention is to obviate the use of rotary vane wind responsive devices, along with the need for rotary mounts, bearings and like structure attendant upon the use of rotary vane devices.

Another object of the invention is to obviate the need for moving parts in wind velocity sensing and indicating apparatus whereby substantially to reduce the need for servicing and repair and to avoid the possibilities of misoperation resulting from sticking or worn parts.

A further object of the invention is to provide a wind velocity sensing device having no moving parts and which can be mounted on a post or roof top in a relatively stationary manner and which will yield accurate readings of wind velocity, irrespective of the direction of the wind.

A further object of the invention is to provide a wind velocity meter possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinaions thereof, and the mode of operation as hereinafter described or illustrated in the accompanying drawings, or their equivalents.

Figure 1:
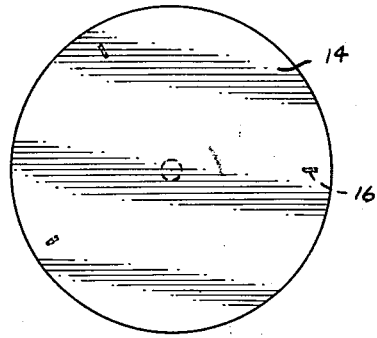
Figure 3:
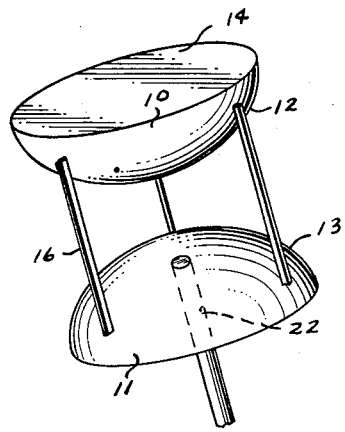
Figure 2:
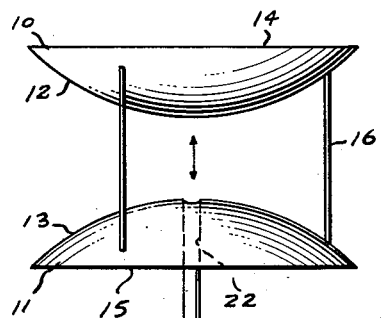
Figure 2:
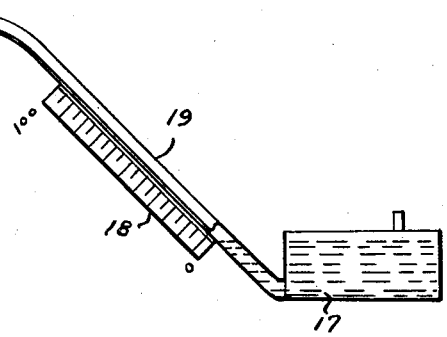

Referring to the accompanying drawing wherein is shown one but obviously not necessarily the only form of embodiment of the invention:

FIG. 1 is a top plan view of a wind velocity sensing device in accordance with the illustrated embodiment of the invention;

FIG. 2 is a view, partly diagrammatic in form, of a sensing device in accordance with FIG. 1 and of a relatively remote indicating device, together with the interconnecting flexible tube by which changes in wind velocity at the sensing device are communicated to the indicating device as changing conditions to which it may respond; and FIG. 3 is a view in perspective of the sensing device as illustrated in FIG. 2.

Like parts are indicated by similar characters of reference throughout the several views.

Referring to the drawing, a wind velocity sensing device in accordance with the illustrated embodiment of the invention comprises a pair of circular members 10 and 11, each having at least one surface which is convex, and in the present instance is hemispherical in nature. Thus, the member 10 has such a surface 12 while the member 11 has such a surface 13. The members 10 and 11 are identically constructed and apart from the hemispherical surfaces 12 and 13 are preferably constructed for a minimum resistance to air flow. Thus, the respective surface may terminate in respective flat surfaces 14 and 15. The latter are on opposite sides of their respective members, with reference to the convex or hemispherical surfaces, and merge with the latter in a relatively sharp edge at the perimeter of the member.

The circular members 10 and 11 are assembled in a unitary relation with one another by separator posts 16 which hold the members in an opposing, superposed position with the longitudinal axes thereof aligned with one another. The posts 16 are selected and arranged to be few in number, for example three, and to offer slight or negligible resistance to the flow of air through the space between the members 10 and 11. The circular members are, as shown, arranged with their curved surfaces 12 and 13 facing one another. The arrangement provides that in the common axis of the assembled members the surfaces 12 and 13 are spaced apart a minimum distance and at the perimeters of such members the surfaces are spaced apart a maximum distance, with the points of minimum and maximum spacing being connected by a curving line. The curved surfaces accordingly provide a venturi-like passageway through the sensing device wherein the air entering at the periphery has its velocity increased as it passes through the center of the device. Since the surfaces 12 and 13 are hemispherical in nature, a passageway as described is presented at any and all points about the full circumference of the device so that irrespective of the direction of wind flow, the sensing device presents a passage therethrough which is gradually restricted toward the axis of the device.

The sensing unit is suitably adapted to be stationarily mounted on a post or roof top in order that it is exposed to wind flow from all directions. Variations in wind velocity which, in accordance with known physical laws, produce changes in static pressure in the throat of the venturi passageway above described, may be read at a relatively remote point through use of a generally conventional pressure measuring instrument. Such an instrument may include, as shown, a vented liquid reservoir 17, a manometer scale 18 traversed by a column 19 of liquid from the reservoir 17, and a flexible open ended tube 21. One end of the latter communicates with the upper end of the column 19. The other end is received in an axial through opening 22 in the member 11, entering from the bottom or flat side 15 thereof and communicating with the narrowmost point or throat of the passage through the sensing device. Changes in static pressure in such throat are transmitted through the tube 21 to the level of the liquid in column 19, causing such level to rise and fall in an inverse relation to the static pressure. The scale 18 may be calibrated in terms of wind velocity whereby changes in the level of the liquid in column 19 may more readily be read in terms of wind velocity.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claim.

Having thus described my invention, I claim:

A wind velocity sensing device, including a pair of superposed spaced apart hemispherical members arranged with their curved surfaces facing one another, means spaced from the centers of said members offering relatively slight resistance to air flow holding said members in aligned constant spaced relation to one another for a substantially free flow of air through the space between said members from any direction, means in alignment with the centers of the curved surfaces of said members and communicating with the space therebetween for sensing the changes in static air pressure produced by changes in air flow velocity through said space having means for indicating said pressure changes connected therewith.

References Cited in the file of this patent

UNITED STATES PATENTS

| | | |
|---|---|---|
| 1,646,903 | Fales | Oct. 25, 1927 |
| 1,905,401 | Moller | Apr. 25, 1933 |
| 2,645,123 | Hundstad | July 14, 1953 |

FOREIGN PATENTS

| | | |
|---|---|---|
| 10,269 | Great Britain | May 17, 1901 |
| 627,040 | Germany | Mar. 7, 1936 |
| 628,410 | Germany | Apr. 3, 1936 |
| 841,541 | France | Feb. 6, 1939 |
| 851,270 | Germany | Oct. 2, 1952 |